(12) United States Patent
Johnson et al.

(10) Patent No.: US 7,620,537 B2
(45) Date of Patent: Nov. 17, 2009

(54) DISTRIBUTED COMMUNICATIONS EFFECTS MODULE

(75) Inventors: Sherie M. Johnson, Placentia, CA (US); Deanna K. Harden, Fontana, CA (US); Thomas E. Stayonoff, Rialto, CA (US); Greg S. Wolff, Orange, CA (US)

(73) Assignee: Raytheon Company, Waltham, MA (US)

( * ) Notice: Subject to any disclaimer, the term of this patent is extended or adjusted under 35 U.S.C. 154(b) by 236 days.

(21) Appl. No.: 11/148,617

(22) Filed: Jun. 9, 2005

(65) Prior Publication Data

US 2006/0080077 A1  Apr. 13, 2006

Related U.S. Application Data

(60) Provisional application No. 60/579,466, filed on Jun. 14, 2004.

(51) Int. Cl.
*G06G 7/48* (2006.01)
*G06F 9/45* (2006.01)

(52) U.S. Cl. .............................. 703/22; 703/6
(58) Field of Classification Search ............... 703/6, 703/22
See application file for complete search history.

(56) References Cited

U.S. PATENT DOCUMENTS

| | | | |
|---|---|---|---|
| 5,794,128 A | 8/1998 | Brockel et al. | |
| 6,151,567 A | 11/2000 | Ames et al. | |
| 6,684,182 B1 | 1/2004 | Gold et al. | |
| 6,910,063 B1 | 6/2005 | Ramanathan et al. | |
| 6,945,780 B2 | 9/2005 | Perry | |
| 2001/0049594 A1 | 12/2001 | Klevans | |
| 2002/0042706 A1 | 4/2002 | Rodriguez | |
| 2005/0097167 A1 | 5/2005 | Ramanathan et al. | |
| 2007/0203683 A1 | 8/2007 | Kornerup et al. | |

FOREIGN PATENT DOCUMENTS

| | | |
|---|---|---|
| JP | 2000 112331 A2 | 4/2000 |
| JP | 2001 249865 A2 | 9/2001 |
| WO | WO 01/41365 A1 | 6/2001 |
| WO | WO 01/86876 A2 | 11/2001 |
| WO | WO 01/98871 A2 | 12/2001 |

OTHER PUBLICATIONS

"Communications Realism in C4ISR Modeling and Simulation In a Distributed Simulation Environment", Lecetera et al. 1997 IEEE.*
"A Framework for Executing Parallel Simulation using RTI", Yuan et al. 2003 IEEE.*
"High Level Architecture (HLA) Federation with Umbra and OPNET Federates", Brian P. Van Leeuwen. Sandia National Laboratories. Mar. 2004.*
Johnson et al.; "Distributed Communications Effects Module;" U.S. Appl. No. 11/148,616 filed Jun. 9, 2005.
File downloaded from PAIR for U.S. Appl. No. 11/148,616, filed Jun. 9, 2005, file through Jan. 12, 2009, 277 pages.
Final Office Action dated Jul. 27, 2009 for U.S. Appl. No. 11/468,616 filed on Jun. 9, 2005.

* cited by examiner

*Primary Examiner*—Paul L Rodriguez
*Assistant Examiner*—Nithya Janakiraman
(74) *Attorney, Agent, or Firm*—Daly, Crowley, Mofford & Durkee, LLP (57) ABSTRACT

A distributed communications effects module (DCEM) method, apparatus, and computer medium are adapted to provide communications effects to a simulated message in a distributed simulation in order to enhance the ability of the distributed simulation to model real-world behavior.

22 Claims, 6 Drawing Sheets

DISTRIBUTED COMMUNICATIONS EFFECTS MODULE

CROSS REFERENCE TO RELATED APPLICATIONS

This application claims the benefit of U.S. patent application Ser. No. 60/579,466 filed on Jun. 14, 2004 under 35 U.S.C. §119(e), which application is hereby incorporated herein by reference in its entirety.

STATEMENT REGARDING FEDERALLY SPONSORED RESEARCH

Not Applicable.

FIELD OF THE INVENTION

This invention relates generally to simulation methods and devices, and, more particularly, to simulation methods and devices adapted to provide communications effects in a distributed simulation.

BACKGROUND OF THE INVENTION

Hardware-in-the-loop is a known simulation technique that allows either parts of a simulation or the entire simulation to be operated by real operational hardware, such as sensors, radars, etc. Man-in-the-loop is a known simulation technique that allows a user to be in control of one or more systems used in a simulation, and the simulation does not run without interaction and control by the user.

In general, a simulation need not include a man-in-the-loop simulation or a hardware-in-the-loop simulation. A "virtual" simulation can operate only within one or more computer platforms, without real operational hardware and without human interaction as the simulation operates.

A simulation can be distributed, operating across multiple computing platforms, or it can be non-distributed, operating in one computing platform. A distributed simulation can include hardware-in-the-loop and/or man-in-the-loops simulations, or it can include only computing platforms, having little or no human interaction during operation of the simulation.

Man-in-the-loop, hardware-in-the-loop simulations, and virtual simulations can provide an environment in which to run scenarios having more than one simulation system. For example, a simulation of a military joint task force command (JTFC) can be coupled to a simulation of an airborne warning and control system (AWACS), providing a simulation of interactions between the JTFC and the AWACS. Either one or both of the simulations can be operated by a human operator (man-in-the-loop) as if the operator were using a real-world system, e.g., a real JTFC or AWACS as used in the field.

Man-in-the-loop, hardware-in-the-loop, and virtual simulations can support training, analysis, development, system integration, and test. Man-in-the-loop, hardware-in-the-loop, and virtual simulations are also useful to validate system designs.

High level architecture (HLA) is a known software structure for generating a high level computer simulation from a group of lower level computer simulations. The HLA provides a structure having rules by which software developers can generate individual lower level software simulations so that they are reusable and can be used by a variety of higher level simulations.

HLA simulations are composed of lower level simulations called "federates" which combine into a high level simulation called a "federation." A federate can exist with multiple instances in a federation. For example, there can be several instances of a simulation of a particular weapons system, each a federate to a high level aircraft simulation, which can be the federation. Federates can also include system functions such as interfaces to human operators, interfaces to real operational hardware, and interfaces to general software functions such as data collection, data analysis, and data display. Federates can join and resign from a federation either statically or dynamically as the higher level simulation executes.

The HLA includes three components, HLA rules, HLA interface specifications, and an HLA object model template (OMTs). The HLA rules include both federation rules and federate rules. The federation rules include a requirement for a federation object model (FOM) in compliance with the OMT, and documentation thereof.

The federation rules also establish a run-time infrastructure (RTI) in compliance with the HLA interface specifications. The RTI includes software having an executive portion that runs globally, and client portions associated with each federate. The federate rules make use of the RTI and specify data exchange with other members of the federation by way of the RTI. The HLA interface specification identifies how federates interact with the federation and with each other.

As is known, a federation can include a hierarchy of "object classes," "object instances" associated with the object classes, "object class attributes" associated with the object instances, and "object attribute values" associated with the object class attributes. When running, the federation generates the object attribute values (i.e., data). For example, an object class can be "aircraft," object instances thereof can be "Boeing 747," "Boeing 707," etc., an object class attribute can be "altitude," and an object attribute value can be "1000 feet."

This relationship can be shown as a hierarchy along with the above example as indicated below.

EXAMPLE

| | |
|---|---|
| object class | aircraft |
| object instance | 747 |
| object class attribute | altitude |
| object attribute value | 1000 feet |

As is also known, a federation can also include a hierarchy of "interaction classes," "interaction class parameters" associated with the object classes, and "interaction parameter values" associated with the interaction class parameters. When running, the federation generates the interaction parameter values. For example, an interaction class can be "munitions detonation," an interaction class parameter can be "radius," and an interaction parameter value can be "seven meters."

This relationship can be shown as a hierarchy along with the above example as indicated below.

EXAMPLE

| | |
|---|---|
| interaction class | munitions detonation |
| interaction class parameter | radius |
| interaction parameter value | 7 meters |

Figure 1:
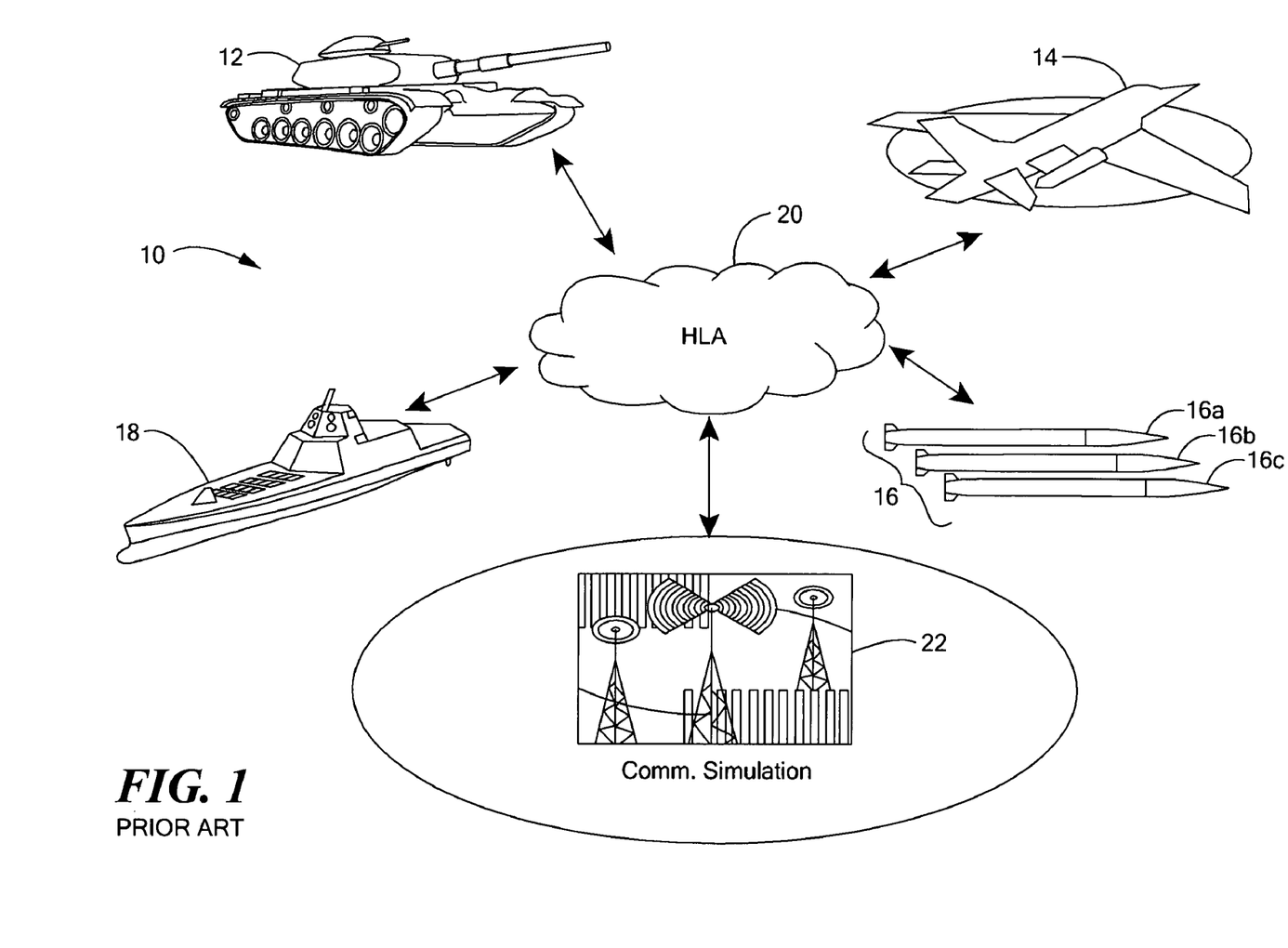
FIG. 1 is a pictorial of prior art simulation environment having a high level architecture (HLA) structure and a communications effects simulation.

Referring to FIG. 1, a prior art simulation environment 10 includes a simulated tank 12, a simulated aircraft 14, simulated missiles 16a-16c, and a simulated ship 18, each of which are federates in an HLA federation. The federates 12-18 can include internal simulations of communications equipment (not shown) adapted to allow the federates to communicate through a high level architecture 20 (HLA), which can include a physical layer.

It will be appreciated that during simulation execution, the federates 12-18 can communicate with each other. For example, the simulated ship 18 having a transmitter simulation (a "source federate") can transmit a simulated message to the simulated aircraft 14 (a "destination federate"), to direct the simulated aircraft 18 toward a target (not shown). The simulated message travels over the physical layer of the HLA 20.

A communications simulation 22 can apply simulated communications effects to one or more of the simulated messages. To this end, a simulated message from a source federate can be received by the communications simulation 22 via the HLA 20, the communications simulation 22 can apply the simulated communications effects to the simulated message, and the communications simulation 22 can re-transmit the simulated message to a destination federate. With this arrangement, the communications simulation acts as an intermediate destination federate and an intermediate source federate, able to receive a simulated message and re-transmit the simulated message.

Simulated communications effects can include, for example, a fading loss (e.g., for simulated analog radio communications) or a packet loss (e.g., for simulated digital communications), provided by the communications effects simulation 22.

It should be apparent that the simulation environment 10 having the single communications simulation 22 requires that the simulated message transmission be directed to the communications effects simulation 22. To this end, the federates 12-18 are altered to provide this direction. Furthermore, it should be apparent that a simulated message must traverse the HLA 20 physical layer twice, resulting in a physical layer bandwidth reduction.

SUMMARY OF THE INVENTION

While the method and apparatus of the present invention are shown and described in conjunction with military simulations, simulators, and systems, it should be understood that the invention applies equally well to any simulation or simulator representing two or more systems that communicate with each other.

In accordance with the present invention, a method associated with a simulated source object and with a simulated destination object operable in a computer simulation includes providing a first distributed communications effects module (DCEM) associated with the simulated source object. The method also includes receiving a simulated message with the first distributed communications effects module. The method still further includes applying simulated communications effects to the simulated message with the first distributed communications effects module and transmitting the simulated message to a second distributed communications effects module (DCEM) associated with the simulated destination object.

In accordance with another aspect of the present invention, apparatus associated with a simulated source object and with a simulated destination object operable in a computer simulation includes a first distributed communications effects module (DCEM) associated with the simulated source object. The first distributed communications effects module (DCEM) is adapted to receive a simulated message. The first distributed communications effects module is also adapted to apply simulated communications effects to a simulated message. The first distributed communications effects module is further adapted to transmit the simulated message to a second distributed communications effects module (DCEM) associated with the simulated destination object.

In accordance with yet another aspect of the present invention, computer usable medium having computer readable code thereon associated with a simulated source object and with a simulated destination object operable in a computer simulation includes program code having instructions for providing a first distributed communications effects module (DCEM) associated with the simulated source object. The computer usable medium further includes instructions for receiving a simulated message with the first distributed communications effects module and instructions for applying simulated communications effects to the simulated message with the first distributed communications effects module. The computer usable medium still further includes instructions for transmitting the simulated message to a second distributed communications effects module (DCEM) associated with the simulated destination object.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the distributed communications effects module, some introductory concepts and terminology are explained. As used herein, the term "operational simulation" is used to describe a simulation running in an "operational simulator" which is a simulation system using actual real-world operational hardware and software, but communicating with other simulation systems over one or more networks, rather than over communication links that the systems normally use for communication. The real-world operational hardware may have modifications to enable this communication. For example, an operational simulation of an airborne warning and control system (AWACS) runs on actual AWACS hardware used as an operational simulator but does not communicate with other systems over a radio link used by an actual AWACS system. Instead, the AWACS operational simulator can communicate or is otherwise modified to communicate, for example, with a JSF operational simulator, over an electronic network, for example an Ethernet network or the Internet network.

It should be recognized that an operational simulator can be but one element in a distributed simulation, providing a hardware-in-the-loop simulation. Also, the operational simulator may require a human operator, providing also a man-in-the loop simulation.

As used herein, the term "virtual simulation" is used to describe a simulation running in a "virtual simulator" which does not include an operational system using actual real-world operational hardware and software. Generally, the virtual simulation uses software portions that model operational software behavior, and the virtual simulator is a computing platform, for example, a personal computer.

It should be recognized that a virtual simulator can also be but one element in a distributed simulation. The virtual simulator may require a human operator, resulting in a man-in-the-loop simulation.

A simulation environment system can include one or more operational simulators and/or one or more virtual simulators. For example, the AWACS simulator described above can be an operational simulator using operational hardware and software. The JSF aircraft simulator communicating with the AWACS operational simulator can be a virtual simulator, provided, for example, by a computer, and using, for example, software other than the operational software.

As used herein, the term "real-world" refers to systems, effects, and scenarios associated with systems used in actual operation. For example, a real-world airborne warning and control system (AWACS) is an aircraft system having operational hardware and software, as opposed to an operational simulation or a virtual simulation of the AWACS.

As used herein, the term "simulated communication link" refers to a simulated communication path having a simulated transmitter at one end a simulated receiver at the other end.

As used herein, the term "simulated source object" can refer to an object instance, for example, a radio transmitter, within a federate, for example, a ship simulation, in an HLA environment. The simulated source object is a source of a "simulated message" that can traverse one or more simulated communication links. However, as further described below, the concept of a simulated source object, which is the source of a simulated message, also applies to a non-HLA distributed simulation environment.

As used herein, the term "simulated destination object" can refer to an object instance, for example, a radio receiver, within a federate, for example, a ship simulation, in an HLA environment. The simulated destination object is a destination (i.e., a receiver) of a simulated message that can traverse one or more simulated communication links. However, as further described below, the concept of a simulated destination object, which is the receiver of a simulated message, also applies to a non-HLA distributed simulation environment.

As used herein, the term "simulated object" is used to describe either a simulated source object or a simulated destination object. In an HLA simulation, a simulated object can be an object instance.

As used herein, the term "communications effects" refers to real-world occurrences and environments, and simulations thereof, which can impact the quality of communications. For example, communications effects can include, but are not limited to, RF fade, delay, packet dropouts, jitter, throughput limitations, packet losses, trees, hills, atmospheric conditions, and range (i.e., distance). "Simulated communications effects" are simulations of the above-described communications effects. The simulated communications effects are more fully described below in conjunction with FIG. 2

As used herein, the term "fidelity" is used to describe the ability of a simulation to model real-world behavior. Therefore, a simulation having high fidelity models real-world behavior better than a simulation having low fidelity.

As used herein, the term "federation-execution data" is used to include, but is not limited to, the above-described HLA object classes, object instances, object class attributes, object attribute values, interaction classes, interaction class parameters, interaction parameter values, and interaction occurrence data sets. It should be recognized that the federation-execution data can include a simulated position (geographic coordinates, altitude, etc.) of each of the simulated source objects and simulated destination objects.

As used herein, the term "virtual information" is used more generally to describe information associated with any simulation, including, but not limited to federation-execution data associated with an HLA simulation. It should be recognized that the virtual information can include a simulated position (geographic coordinates, altitude, etc.) of each of the simulated source objects and simulated destination objects. The virtual information can include at least one of a simulated location of the simulated source objects, a simulated location of the simulated destination objects, a simulated foliage, simulated weather information, simulated atmospheric information, simulated cosmic information, and simulated terrain information.

Figure 2:
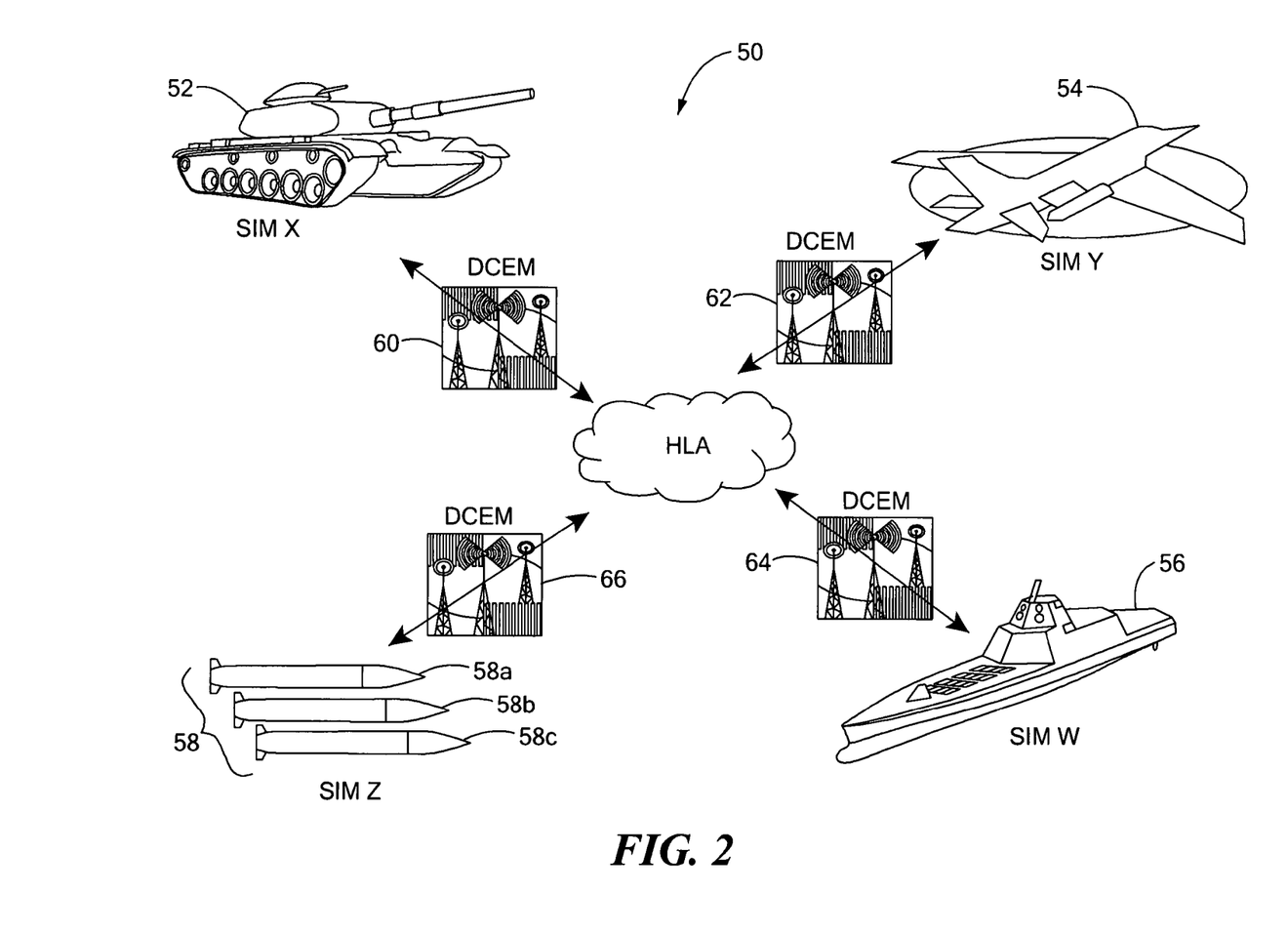
FIG. 2 is a block diagram of a simulation environment in accordance with the present invention having a high level architecture (HLA) structure and a distributed communications effects module (DCEM) associated with respective simulated objects.

Referring now to FIG. 2, a simulation environment 50 includes a simulated tank 52, a simulated aircraft 54, a simulated ship 56, and simulated missiles 58a-58c, each of which are federates (simulated objects) in an HLA federation. Each simulated object 52-58 is coupled to a respective distributed communications effects module (DCEM) 60-66. Each DCEM 60-66 in coupled to an HLA network 68.

Each one of the simulated objects 52-58 can include simulated communications equipment (also simulated objects), for example, a radio transmitter and/or a radio receiver. Furthermore, each one of the simulated objects 52-58 can include a plurality of simulated communications equipment, for example, five radio transmitters and/or five radio receivers and/or five bidirectional digital communication links.

It will be appreciated that during simulation execution, the simulated objects 52-58 can communicate with each other via the respective DCEMs 60-66. For example, the simulated ship 56 (a "simulated source object") can transmit a simulated message via the DCEMs 62, 64 to the simulated aircraft 54 (a "simulated destination object"), to direct the simulated aircraft 54 toward a target (not shown). The simulated message travels over the physical layer of the HLA network 68.

It should be appreciated that the above-described transmission is but one "simulated communication link" that may be involved in transmission of the same simulated message. For example, the same simulated message can be transmitted by the simulated ship 56 at the same time to both the simulated aircraft 54 and the simulated tank 52 (another simulated destination object), forming a parallel simulated communication link. Furthermore, any one of the simulated communication links may be formed from a series of simulated communication links. For example, the transmission from the simulated ship 56 to the simulated aircraft 54 can pass through a simulated satellite (not shown), wherein the simulated satellite receives and re-transmits the simulated message, forming two simulated communications links in series. In this example, the satellite becomes an intermediate simulated destination object that receives the simulated message and also becomes an intermediate simulated source object that re-transmits the message to the intended simulated destination object.

Each DCEM 60-66 can apply simulated communications effects to simulated messages, which pass through it. For example, a simulated message transmitted by the simulated ship 56 (a simulated source object) is received by the DCEM 64. The DCEM 64 can apply simulated communications effects to the simulated message and re-transmit the simulated message, for example, to the simulated aircraft 54 (a simulated destination object) via the DCEM 62. For another example, a simulated message transmitted by the simulated ship 56 and passing through the DCEM 64 is received by the DCEM 62. The DCEM 62 can apply simulated communications effects to the simulated message and provide the simulated message to the simulated aircraft 54. From these examples, it should be apparent that the simulated communications effects can be applied to the simulated message either at a source end of a communication link, at a destination end of a communication link, or both.

It will be appreciated that, as the simulation executes in the simulation environment 50, the simulated ship 56 and the simulated aircraft 54 can by dynamically moving. It is known that physical positions, for example, separation, of communications equipment in the real world, can affect quality of communications. Similarly, simulated physical positions of the simulated objects 52, 54 in the simulation environment 50 can influence simulated communications effects. For example, a large simulated separation between the simulated ship 56 and the simulated aircraft 54 can be associated with a degradation of a simulated message passing between the simulated ship 56 and the simulated aircraft 54 which can be simulated by the simulated communications effects.

Each one of the DCEMs 60-66 can request virtual information (i.e., HLA-federation-execution data) from the HLA 68, including, but not limited to, a position (e.g., geographic position, altitude, etc.) of one or more of the simulated objects 52-58. To this end, it will be appreciated that each one of the DCEMs can act as an HLA federate, capable of subscribing to (joining) the HLA federation to receive information about one or more of the simulated objects 52-58. Each one of the DCEMs can retain knowledge of simulated locations of one or more of the simulated objects 52-58.

The above examples are representative of one communication link, a communication link between the simulated ship 56 and the simulated aircraft 54. As described above, more complex communication link arrangements are also possible. For example, the simulated ship 56 can send the same simulated message to both the simulated aircraft 54 and the simulated tank 52 on two simulated communication links. It will be appreciated that the two communication links can be representative of the same physical type of communication hardware and/or information protocol type or different types of communication hardware and/or information protocol types (e.g., an analog radio link having an FM protocol and a digital radio link having a network protocol). Each simulated communication hardware type and/or simulated information protocol type can be associated with different types of simulated communications effects. It will also be appreciated that, as the simulation executes in the simulation environment 50, the simulated ship 56, the simulated aircraft 54, and the simulated tank 52 can by dynamically moving relative to each other. As described above, simulated physical positions of the simulated objects 52-56 can influence simulated communications effects.

The DCEM 64 can apply simulated communications effects to the simulated message from the simulated ship 56 to the simulated aircraft 54, which can be the same as or different than simulated communications effects applied by the DCEM 64 to the simulated message from the simulated ship 56 to the simulated tank 54. Similarly, the DCEM 62 can apply simulated communications effects to the simulated message from the simulated ship 56 to the simulated aircraft 54, which can be the same as or different than simulated communications effects applied by the DCEM 60 to the simulated message from the simulated ship 56 to the simulated tank 54.

Still other communication link arrangements are also possible. For example, the simulated ship 56 can transmit a simulated message to which simulated communications effects are applied by the DCEM 64. The simulated message can be transmitted, for example, by a simulated radio transmitter included within the simulated ship 56. The simulated message can be directed back via the same DCEM 64 to the simulated ship 56, for example to a simulated radio receiver included in the simulated ship 56. Additional simulated communications effects can be applied by the DCEM upon directing the simulated message back to the simulated ship 56.

As should be apparent from the discussion above, the simulation environment 50, having the plurality of DCEMs 60-66 in a distributed arrangement, can provide a wide variety of simulated communication link network topologies.

The simulated communications effects can be generated by one or more of the DCEMs in a variety of ways, which are described more fully in conjunction with FIGS. 4 and 5 below. The simulated communications effects can include at least one of a simulated message completion effect and a simulated message delay effect. The simulated message completion effects can include, but are not limited to, a fading effect (e.g., for simulated analog radio communications), and a packet loss (e.g., for simulated digital communications), an RF propagation, a contention, and data collisions. The simulated message delay effects can include, but are not limited to network access delays, relaying, propagation, re-transmission, and queuing.

Figure 3:
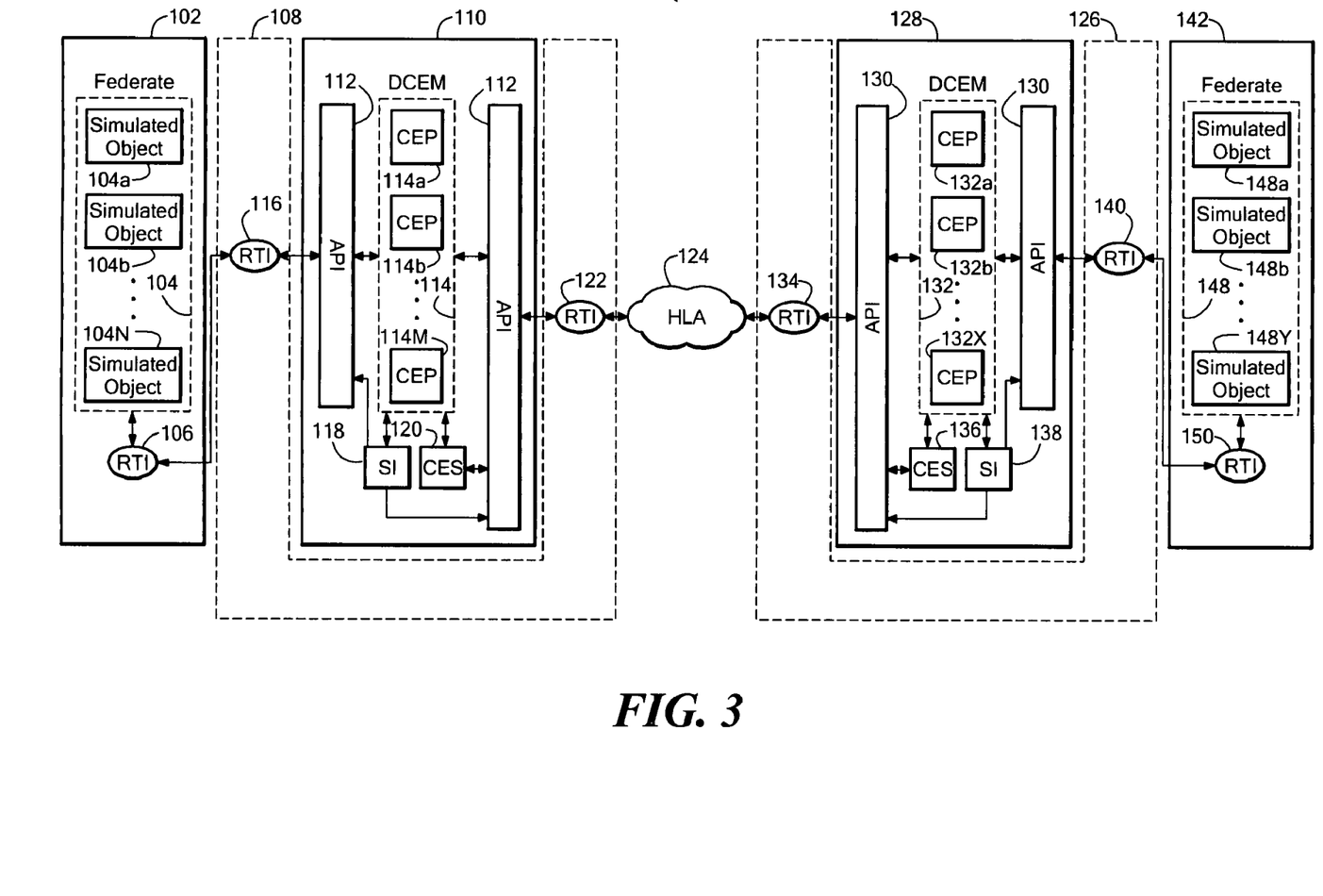
FIG. 3 is a block diagram of a simulation environment showing two distributed communications effects modules coupled to communicate through the HLA.

Referring now to FIG. 3, a simulation architecture 100 includes a first federate 102 (a simulated object) coupled to a first distributed communications effects module (DCEM) 110. The first DCEM 110 is coupled in an HLA federation to an HLA network 124, i.e., a physical layer. Similarly, the federation architecture 100 includes a second federate 142 (a simulated object) coupled to a second DCEM 128. The second DCEM 128 is coupled in the HLA federation to the HLA network 124. The first federate 102 can be within the same computing platform as the first DCEM 110 and the second federate 142 can be within the same computing platform as the second DCEM 128. However, in other embodiments, the first federate 102 is within a different computing platform then the first DCEM 110 and the second federate 142 is within a different computing platform than the second DCEM 128.

Taking the first federate 102 as representative of the second federate 142 and other federates that might exist in the simulation architecture 100, the first federate 102 includes one or more simulated objects 104 coupled though a run-time infrastructure (RTI) 106 to the first DCEM 110. For example, the first federate 102 can represent a ship and a simulated object 104a can represent a radio transmitter aboard the ship.

Taking the first DCEM 110 as representative of the second DCEM 128 and other DCEMs that might be present in the simulation architecture 100, the first DCEM 110 include a run-time infrastructure (RTI) 116 coupled to the first federate 102. The RTI 116 exists in a software wrapper 108 surrounding the first DCEM 110. The RTI 106 and the RTI 116 can support, for example, communication of a simulated message from the simulated object 104a to an application programming interface (API) 112 in the first DCEM 110. The API 112 is shown as two boxes for clarity.

The API 112 is coupled to one or more communications effects protocol (CEP) modules 114, each adapted to provide respective simulated communications effects associated with a respective simulated communication hardware type and/or simulated information protocol. For example, in operation, a CEP module 114a can provide simulated communications effects associated with a simulated digital data transmitter (e.g., simulated source object 104a) having a simulated Ethernet information protocol. For another example, in operation, another CEP module 114b can provide simulated communications effects associated with a simulated analog radio transmitter (e.g., simulated source object 104b) having a simulated FM information protocol. The CEP modules 114 are described more fully below in conjunction with FIG. 4.

The first DCEM 110 can also include a communications effects server (CES) 120. In operation, the CES 120 can request and receive virtual information from the simulation environment 100, i.e., from the HLA federation. The virtual information can include, but is not limited to, a simulated position of each of the simulated objects 104, 148 as the HLA federation executes a simulation. The virtual information can be retained by the CES 120 and can be updated from time to time as the simulation executes. The virtual information can be provided to the CEP modules 114 and the simulated communications effects can be generated by the CEP modules 114 in accordance with the simulated communications effects. Generation of the simulated communications effects is described more fully below in conjunction with FIG. 5.

The DCEM 110 can also include a system interconnect (SI) module 118. In operation, the SI module 118 can receive a simulated message to which communications effects have been applied by a CEP module, for example, the CEP module 114a, and can route the simulated message to another CEP module, for example, the CEP module 114b, which can apply further communications effects. Operation of the SI module 118 is described more fully below in conjunction with FIG. 4.

In operation, the simulated message, having passed through one or more CEP modules 114, passes again through the API 112 to another RTI 122, to the HLA network 124, and through an RTI 134 to an API 130 associated with the second DCEM 128.

It will be appreciated that the first DCEM 110 can appear to the first federate 102 as another federate by way of the RTIs 106, 116. Furthermore, the first DCEM 110 (combined with the first federate 102) can appear as a federate to the HLA network by way of the RTI 122. Therefore, the software wrapper 108, having the RTIs 118, 122 can make the first DCEM 108 appear to be transparent to the first federate 102.

With the above arrangement, the first DCEM 110 can be inserted between the first federate 102 and the HLA network 124 and can appear transparent, i.e., can appear as the first federate 102 to the HLA network 124, but with simulated communications effects applied. Similarly, the second DCEM 128 can be inserted between the second federate 142 and the HLA network 124 and can appear transparent, i.e., can appear as the second federate 142 to the HLA network 124, but with simulated communications effects applied.

While two federates 102, 142, two associated DCEMs 110, 128, and two associated software wrappers 108, 126 are shown, in other embodiments there can be more than two or fewer than two of each of these elements.

While RTIs 106, 116 are shown to couple the first federate 102 to the first DCEM 110, and RTIs 150, 140 are shown to couple the second federate 142 to the second DCEM 128, in other embodiments, the first federate 102 is coupled directly to the API 112, without use of RTIs 106, 116 and/or the second federate 142 is coupled directly to the API 130, without use of RTIs 150, 140. This arrangement, however, requires enhancements to the first federate 102 and/or to the second federate 142 from that which would be designed to interface in an HLA environment.

It should be recognized that the above described system and techniques do not apply only to an HLA federation. While and HLA network 124 is shown, in other embodiments, the network 124 can be any network that supports a distributed simulation environment. Furthermore, in other embodiments, the first and second federates 102, 142 can be non-HLA simulated objects having internal simulated objects similar to simulated objects 104, 148. In embodiments of other distributed simulation environments, other software wrappers, similar to the software wrappers 108, 126 can be provided, which result in the DCEMs appearing transparent to the other distributed simulation environments.

Figure 4:
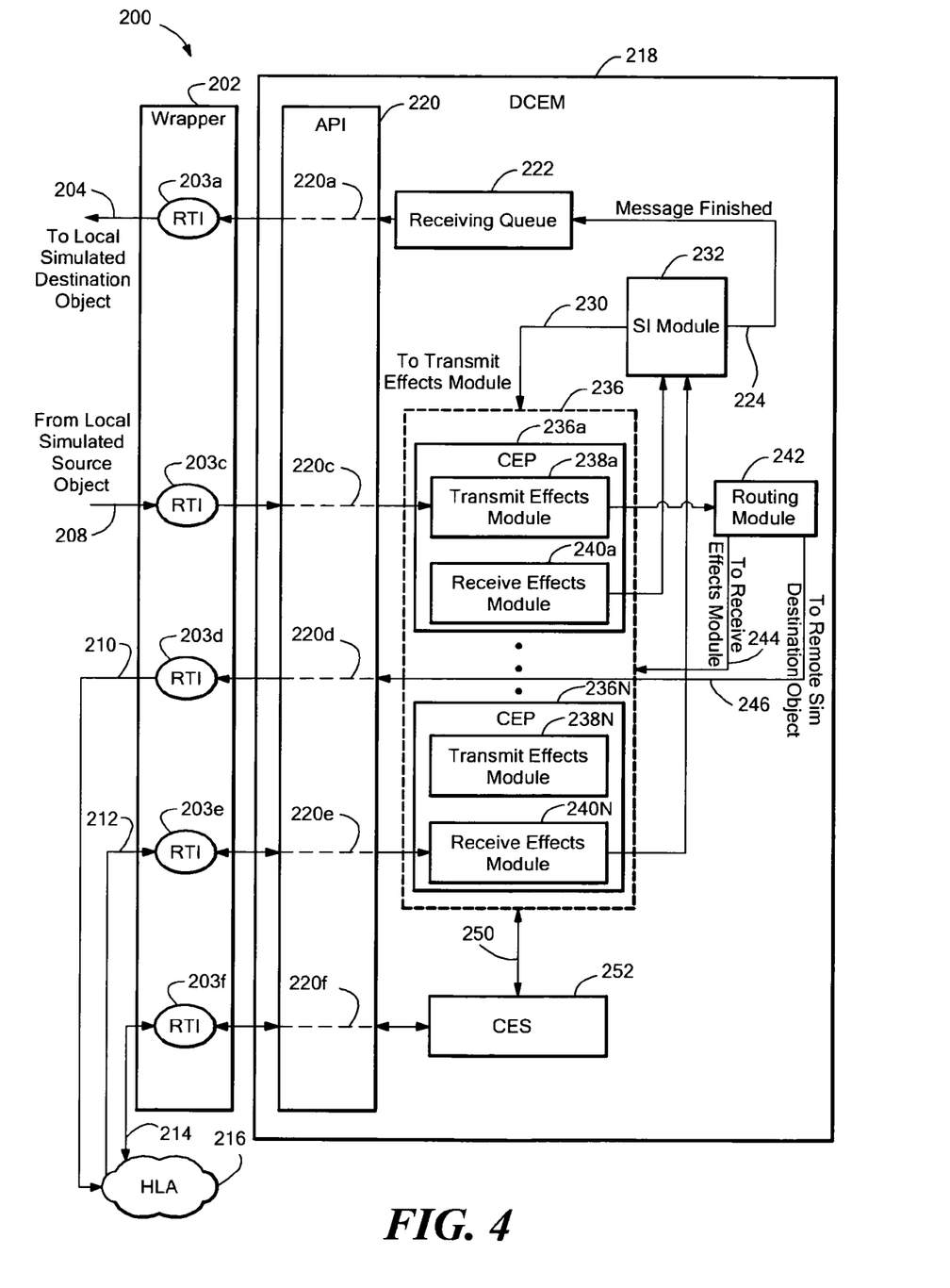
FIG. 4 is a block diagram showing further details of a distributed communications effects module as used in the simulation environment of FIG. 3, having communications effects protocol (CEP) modules and having an associated software "wrapper"

Referring now to FIG. 4, a simulation architecture 200 includes a distributed communications effects module (DCEM) 218 coupled through a software wrapper 202 to an HLA network 216 and also to one or more simulated objects (not shown). The DCEM 218 can be the same as or similar to the first and second DCEMs 110, 128 of FIG. 4 and the DCEMs 60-66 of FIG. 2.

The DCEM 218 includes an API 220, which can be he same as or similar to the APIs 112, 130 of FIG. 3. The API 220 can provide interface software instructions, represented by dashed lines 220a, 220c-220f. The interface software instructions can be of any form, and need not be in any particular programming language.

The DCEM 218 can also include one or more communications effects protocol (CEP) modules 236a-236N. The CEP modules 236 can be the same as or similar to the CEP modules 114, 132 of FIG. 3. Each one of the CEP modules 236a-236N can include a respective transmit effects module 238a-238N and a respective receive effects module 240a-240N. Each CEP module 236 is associated with at least one of a respective type of simulated communication hardware and a respective type of simulated information protocol.

The DCEM 218 can also include a system interconnect (SI) module 232 coupled to one or more of the CEP modules 236 and also coupled to a receiving queue 222. The SI module 232 can be the same as or similar to the SI modules 118, 138 of FIG. 3.

The DCEM 218 can also include a communications effects server (CES) 252. The CES 252 can be the same as or similar to the CESs 120, 136 of FIG. 3.

The software wrapper 202 can include a plurality of runtime infrastructures 203a, 203c-203f adapted to communicate with the HLA network 216. The software wrapper 202 can be the same as or similar to the software wrappers 108, 126 of FIG. 3. The five RTIs 203a, 203c-203f are associated, for example, with the RTIs 116, 122 of FIG. 3. However, in FIG. 4, more RTIs are shown for clarity. While five RTIs 203a, 203c-203f are shown, other embodiments can have more than five or fewer than five RTIs. In one particular embodiment, the five RTIs 203a, 203c-203f are combined into one RTI, and the five RTIs 203a, 203c-203f are functionally representative of the one RTI.

In operation, the CES 252 can request virtual information from the HLA network 216 via the API 220, via the RTI 203f, and via a signal path 214. The virtual information can include, but is not limited to, a simulated position of one or more simulated objects coupled to the HLA network 216, which execute in an operating federation simulation. The CES 252 can receive and retain (store) the virtual information. The CES 252 can update the virtual information from time to time, for example, once every second, or at some other rate appropriate for the rate of simulated movement of relevant simulated objects.

Further operation of the DCEM is described by way of two examples. In a first example, a simulated message is generated by a local simulated source object (not shown) and is presented on the signal path 208. For example, the local simulated source object can correspond to the simulated object 104a of FIG. 3 and the DCEM 218 can correspond to the first DCEM 110 of FIG. 3. The local simulated source object can be within the same computing platform as the DCEM 218. However, in other embodiments, the local simulated source object is in a different computing platform than the simulated source object.

The simulated message is received by the RTI 203c in the software wrapper 202 associated with the DCEM 218. The RTI 203c can be adapted to communicate with the DCEM 218 by way of the API 220, and, in particular, by way of a software instruction represented by the dashed line 220c. The simulated message is directed to a CEP module, for example, the CEP module 236a, and in particular, to the transmit effects module 238a associated with the CEP module 236a.

The simulated message generated by the simulated source object on the signal path 208 is associated with a particular type of simulated communication hardware located on a particular simulated platform, for example, a simulated ship, and associated with a particular simulated information protocol type. For example, the simulated communication hardware can be a simulated digital transmitter located on the simulated ship and the simulated information protocol type can be simulated Internet protocol. The simulated message is directed by the API 220 to a CEP module, here CEP module 236a, which corresponds to, and is able to provide communications effects in accordance with, the simulated communication hardware type and the simulated information protocol type associated with the simulated message presented on the signal path 208. Therefore, if the simulated message were associated with a different simulated hardware type and/or a different simulated information protocol type, the simulated message would be directed by the API 220 to a different CEP module within the DCEM 218 accordingly.

The CEP module 236a can request virtual information from the CES 252 according to the simulated source object (and the simulated platform), which generated the simulated message on the signal path 208, according to a simulated destination object to which the simulated message is directed, and/or according to any intermediate simulated objects which may receive and re-transmit the simulated message along one or more simulated communication links between the simulated source object and the simulated destination object.

The virtual information includes position information as described above. The transmit effects module 238a applies simulated communications effects to the simulated message in accordance with the virtual information and also in accordance with the simulated communication hardware type and in accordance with the information protocol type associated with the particular CEP module 236a. To this end, the CEP module 236a can include one or more communications effects simulations. The one or more communications effects simulations are described more fully below in conjunction with FIG. 5.

The transmit effects module 238a presents the simulated message (to which simulated communications effects have been applied) to a routing module 242. If the first (or final) simulated destination object is local to the DCEM 218, (i.e., within the federate 102 of FIG. 3, where the DCEM 218 corresponds to the first DCEM 110 of FIG. 3) then the simulated message is directed back to the CEP modules 236, and to a particular receive effects module within a CEP module associated with a simulated receiving communication hardware type and the simulated information protocol type. In one particular embodiment the simulated message is directed to a second instantiation (not shown) of the CEP module 236a, and in particular to a second instantiation of the receive effects module 240a. In yet another embodiment, the simulated message is directed to the first instantiation of the receive effects module 240a, and this embodiments will be used for further description of this example.

Where the simulated message is directed to the receive effects modules 240a, the simulated message can have further simulated communications effects applied by the receive effects module 240a in much the same way as described above for the transmit effects module 238a. However, in another embodiment, only one of (or neither of) the transmit effects module 238a and the receive effects module 240a applies simulated communications effects to the simulated message.

The simulated message is then directed to the SI module 232. If the simulated message has passed through the final simulated communication link between the simulated source object and a simulated destination object, then the message is sent on signal path 224 to the receiving queue 222. The simulated message is sent via the API 220 and via the RTI 203a to a local simulated destination object.

If the simulated message has not yet passed through the last simulated communication link, the simulated message can instead be directed by the SI module 232 to a next one of the CEPs 236, and in particular to a next one of the transmit effects modules 238a-238N within one of the CEP modules 236. The next CEP module to which the simulated message is directed can be associated with another simulated communication hardware type and/or another information protocol type. However, the next CEP module to which the simulated message is directed can be associated with the same simulated communication hardware type and/or the same information protocol type, in which case the simulated message can be either directed to another instantiation or the CEP module 236a or, in another embodiment, to the transmit effects module 238a within the CEP module 236a.

From the above discussion, it will be appreciated that any number of communication links can be simulated by feeding the simulated message presented on the signal path 208 back to the CEP modules 236 by way of the SI module 232 and via the routing module 242.

Still in the first example, if the routing module 242 determines that the simulated message is next directed to a remote simulated destination object (for example, simulated object 148a of FIG. 3) then the routing module 242 directs the simulated message on a signal path 246 to the API 220, through the RTI 203d and on another signal path 210 to the HLA network 216, toward the remote simulated destination object.

Now, in a second example, a simulated message is generated by a remote simulated source object and is received on yet another signal path 212. For example, the remote simulated source object can correspond to the simulated object 148b of FIG. 3 and the DCEM 218 can correspond to the first DCEM 110 of FIG. 3.

The simulated message is received by the RTI 203e in the software wrapper 202 associated with the DCEM 218. The RTI 203e1 communicates with the DCEM 218 by way of the API 220, and, in particular, by way of a software instruction represented by the dashed line 220e. The simulated message is directed by the API 202 to a CEP module, for example, to the CEP module 236N, and in particular, to the receive effects module 240N associated with the CEP module 236N.

The simulated message generated by the remote simulated source object and received on the signal path 212 is associated with a particular type of simulated communication hardware located on a particular simulated platform, for example and aircraft, and is associated with a particular simulated information protocol type. For example, the simulated communication hardware can be a simulated RF analog transmitter located on a simulated aircraft and the simulated information protocol type can be simulated FM. The simulated message is directed by the API 220 to a CEP module, here CEP module 236N, which corresponds to, and is able to provide communications effects in accordance with, the simulated communication hardware type and the simulated information protocol type associated with the simulated message received on the signal path 212. As described above, if the simulated message were associated with a different simulated hardware type and/or a different simulated information protocol type, the simulated message would be directed by the API 220 to a different CEP module within the DCEM 218 accordingly.

The CEP module 236N can request virtual information from the CES 252 according to the simulated source object (and simulated platform), which generated the simulated message on the signal path 212, according to a simulated destination object to which the simulated message is directed, and/or according to any intermediate simulated objects which may receive and re-transmit the simulated message along one or more simulated communication links between the simulated source object and the simulated destination object. The virtual information includes position information as described above.

The receive effects module 240N can apply simulated communications effects to the simulated message in accordance with the virtual information and also in accordance with the simulated communication hardware type and in accordance with the information protocol type associated with the particular CEP module 236N. To this end, the CEP module 236N can include one or more communications effects simulations. The one or more communications effects simulations are described more fully below in conjunction with FIG. 5.

The receive effects module 240N presents the simulated message (to which simulated communications effects have been applied) to the SI module 232. If the simulated message has passed through the final simulated communication link between the simulated source object and the simulated destination object, then the message is sent on the signal path 224 to the receiving queue 222. The simulated message is sent via the API 220 and via the RTI 203a to the local simulated destination object.

As described above, if the simulated message has not yet passed through the last simulated communication link, the simulated message can instead be directed by the SI module 232 to a next one of the CEP modules 236, and in particular to a next one of the transmit effects modules 238a-238N within one of the CEP modules 236. The next CEP module to which the simulated message is directed can be associated with another simulated communication hardware type and another information protocol type. However, the next CEP module to which the simulated message is directed can be associated with the same simulated communication hardware type and the same information protocol type, in which case the simulated message can be either directed to another instantiation of the CEP module 236N or, in another embodiment, to the transmit effects module 238N within the CEP module 236N.

From the above discussion, it will be appreciated that the transmit effects modules 238 and the receive effects modules 240 are associated in pairs, wherein a simulated message received by a receive effects module, for example, the receive effects module 240N, has an associated local or remote transmit effects module, and a simulated message received by a transmit effects module, for example, the transmit effects module 238a, has an associated local or remote receive effects module.

Figure 5:
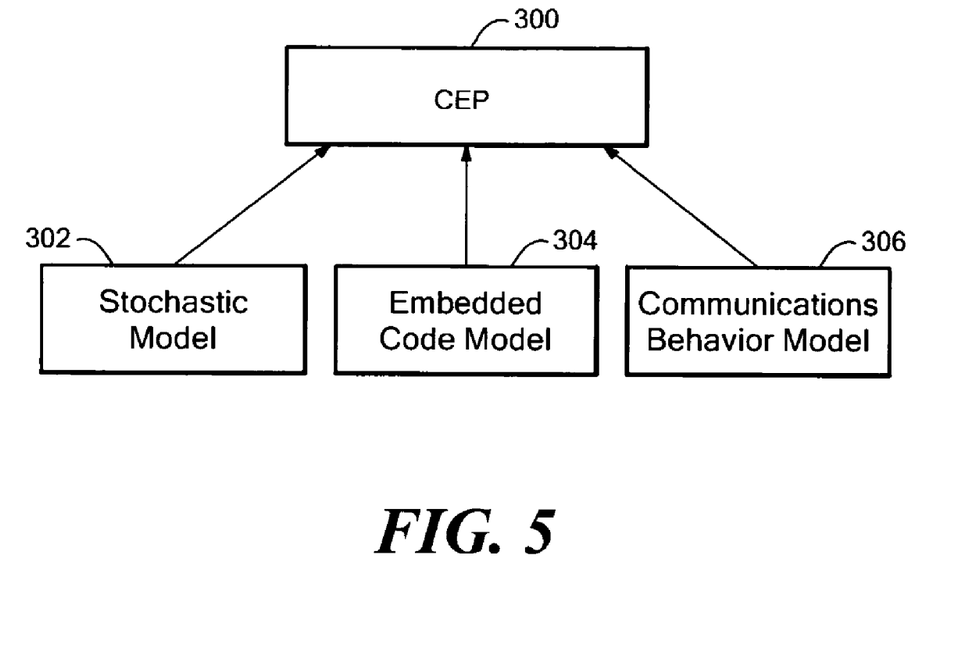
FIG. 5 is a block diagram showing further details of a communications effects protocol object as used in the communications effects module of FIG. 4.

Referring now to FIG. 5, a communications effects protocol module 300 can include one or more of a stochastic model 302, an embedded code model 304, and a communications behavior model 306. Each one of the models 302-306 can be used to generate the above-described simulated communications effects in accordance with HLA-federation-execution data (e.g., virtual information) acquired by and retained by the communications effects server (CES) (e.g., 252, FIG. 4).

The stochastic model 302 can provide a mathematical model of a communications environment, making use of mathematical distributions to represent the message completion rates and delay of a particular communications system.

The embedded code model 304 can provide, for example, a software model of code embedded in a piece of real-world communication hardware. Also, the embedded code model 304 can include all, or portions of, real embedded code associated with a piece of real-world communication hardware.

The communications behavior model 306 can include a high fidelity model of real-world behavior, including, but not limited to, network access protocols, packet collision detection, contention, retransmissions, error correction, RF propagation, line-of-sight processing, and antenna characteristics such as gain and pattern. In one particular embodiment, the communications behavior model 306 includes all or portions of behavior extracted from an OPNET® model. OPNET® (OPNET Technologies, Inc.®) provides a large comprehensive library of discrete event simulation models for the modeling of communication link physical layers, communication hardware, communication data types, communication protocol types, and communication encryption types, for both wired and wireless communications, and including satellite communications. OPNET® provides high fidelity models of a variety of communication environments.

At least one of the stochastic model 302, the embedded code model 304, and the communications behavior model 306 can generate at least one of the simulated message completion effect and the simulated message delay effect, described more fully above in conjunction with FIG. 2.

As described, for example in conjunction with FIG. 4, the CEP module 300 can include a transmit module and a receive module. Furthermore, a given CEP module is associated with at least one of a communication hardware type and an information protocol. Therefore, the transmit effects module and the receive effects module can make use of the same stochastic model 302, the same embedded code model 304, and/or the same communications behavior model 306.

As described in conjunction with FIG. 3, a distributed communications effects module (DCEM) can have a plurality of communications effects protocol (CEP) modules. In some embodiments, the plurality of CEP modules can have different combinations of stochastic models (e.g., 302), embedded code models (e.g., 304), and communications behavior models (e.g., 306). For example, the CEP module 236a (FIG. 3)

can make use of a stochastic model, e.g., 302, and the CEP module 236N (FIG. 3) can make use of a communications behavior model, e.g., 306.

In some embodiments, one or more of the CEP modules can have more than one model. Where a CEP module has more than one model, the model used to generate the communications effects is selected in accordance with a variety of factors, for example, a processing time, a desired fidelity, and a desired behavior.

Figure 6:
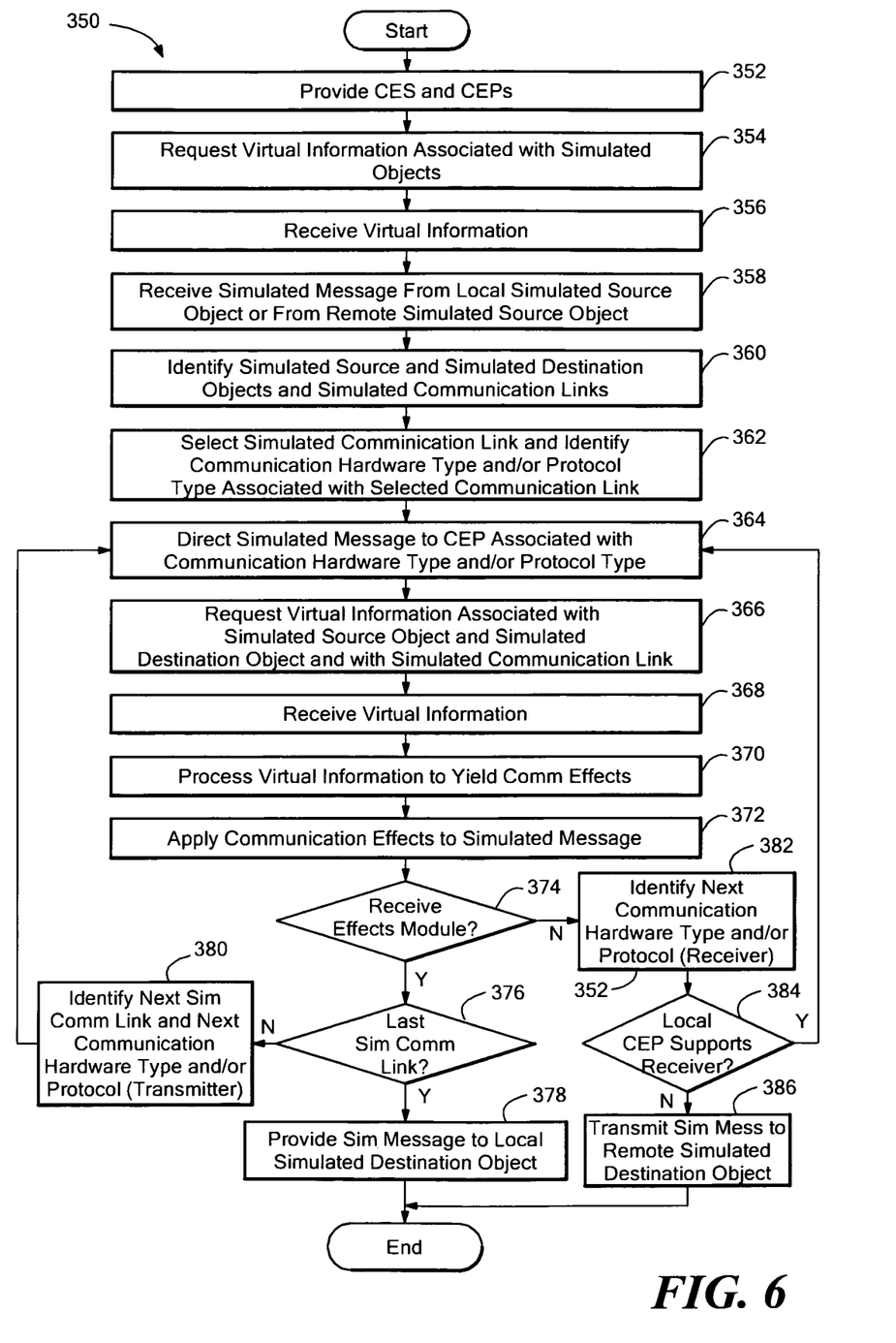
FIG. 6 is a flow chart showing a process associated with the distributed communications effects modules of FIGS. 2-4.

It should be appreciated that FIG. 6 shows a flowchart corresponding to the below contemplated technique which would be implemented in the distributed communications effects modules 110, 128 (FIG. 3) and 218 (FIG. 3). Rectangular elements (typified by element 352 in FIG. 6), herein denoted "processing blocks," represent computer software instructions or groups of instructions. Diamond shaped elements (typified by element 374 in FIG. 6), herein denoted "decision blocks," represent computer software instructions, or groups of instructions which affect the execution of the computer software instructions represented by the processing blocks.

Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the blocks can be performed in any convenient or desirable order.

Referring now to FIG. 6, a process 350 is associated with a distributed communications effects module (DCEM), for example, the DCEMs 110, 128 of FIG. 3 or the DCEM 218 of FIG. 4. The process begins at block 352, where a DCEM is provided having a communications effects server (CES) and one or more communications effects protocol (CEP) modules, as shown, for example, in FIG. 4.

At block 354, virtual information is requested from an HLA simulation, for example the CES 252 of FIG. 4 can request the virtual information from the HLA 216 of FIG. 4. As described above, the virtual information can include a variety of things, including, but not limited to, simulated locations of simulated objects used in the HLA simulation.

The virtual information is received, for example, by the CES 252, at block 356. The CES 252 can retain relevant virtual information for the entire federation, for example, position information associated with each simulated object. The CES can dynamically update the retained virtual information.

At block 358, a simulated message is received from a local simulated source object, or alternatively, from a remote simulated source object (via another DCEM) and, at block 360, one or more simulated source objects, one or more simulated destination objects, and one or more associated communication links are identified from the simulated message. To this end, source and destination addresses associated with a network packet can be used to identify the simulated source objects and a simulated destination objects. The identity of the simulated source objects and the simulated destination objects can be used to identify the associated simulated communication links.

It should be understood that not all network packets passing though the DCEM are associated with a simulated message. For example, a network data packet passing through the DCEM can be an HLA subscription request generated by a federate. Therefore, the DCEM is able, at block 358, to identify a simulated message from among other network packets.

At block 362, one of the communication links identified at block 360 is selected and a communication hardware type and a communication protocol type is identified, which are associated with the selected communication link. For example, for the identified communication link, the simulated source object can be a wired digital transmitter having an Ethernet protocol and the simulated destination object can be a wired digital receiver having the Ethernet protocol. For another one of the communication links identified at block 360, for example, the simulated source object can be a wired digital transmitter having an Internet protocol and the simulated destination object can be a wired digital receiver having the Internet protocol.

Where the simulated message is received from a local simulated source object at block 358, for example, on the signal path 208 of FIG. 4, then at block 364, the simulated message is directed to a CEP module having a transmit effects module (e.g., 238a, FIG. 4) that matches the simulated communication hardware type and/or the simulated information protocol type identified at block 362. Conversely, where the simulated message is received from a remote simulated source object at block 358, for example, on the signal path 212 of FIG. 4, then at block 364, the simulated message is directed to a CEP module having a receive effects module (e.g., 240a, FIG. 4) that matches that the simulated communication hardware type and/or the simulated information protocol type identified at block 362.

In either case, at block 364, the CEP module to which the simulated message is directed requests virtual information (i.e., HLA federation-execution data) from the CES, for example, the CES 252 of FIG. 4. The virtual information is received by the CEP module at block 368.

At block 370, the virtual information is processed by the CEP module to which the simulated message is directed at block 364 to generate simulated communications effects appropriate for the communication hardware type and/or information protocol type. Processing of the virtual information is described above in conjunction with FIG. 5. As described more fully above in conjunction with FIG. 2, the simulated communications effects can include at least one of a simulated message completion effect and a simulated message delay effect.

At block 372, the simulated communications effects generated at block 370 are applied to the simulated message.

At decision block 374, if the simulated message was directed to a receive effects module at block 364, then the process continues to decision block 376. At decision block 376, if the simulated communications link selected at block 362 is the last simulated communication link associated with the simulated message, then the process continues to block 378, where the simulated message is provided to a local simulated destination object. For example, the SI module 232 of FIG. 4 is representative of the decision block 376 and signal path 204 of FIG. 4 is representative of the above-described presenting the simulated message to the local simulated destination object.

At block 376, if the communication link selected at block 362 is not the last communication link from among the communication links identified at block 360, then the process continues to block 380. At block 380, a next simulated communication link is selected from among the simulated communication links identified at block 360 and at least one of a communication hardware type and a communication protocol associated with a next transmitter is identified. The process continues to block 364, where again, the simulated message is directed to a CEP module associated with the at least one of the communication hardware type and the communication protocol, i.e., to a CEP module that support the communication hardware type and/or information protocol identified at block 380.

If at block 374, the simulated message was not directed to a receive effects module in a CEP module at block 364 (i.e., the simulated message was directed to a transmit effects module, for example the transmit effects module 238*a* of FIG. 4), the process continues to block 382. At block 382, a next at least one of a hardware type and an information protocol type is identified, which is associated with a simulated receiver, and the process continues to block 384.

At block 384, if there is a local CEP module, which supports the receiver hardware type and/or information protocol type identified at block 382, then the process returns to block 364, where again, the simulated message is directed to a CEP module associated with at least one of the communication hardware type and the communication protocol, i.e., to a CEP module associated with the receiver identified at block 382. At block 384, if there is no local CEP module which supports the communication hardware type and/or information protocol type identified at block 382, then the process continues to block 386, where the simulated message is directed to a remote simulated destination object elsewhere in the federation, i.e., to a CEP module in the remote CEP module which support the communication hardware type and/or information protocol identified at block 382.

While and HLA simulation environments have been shown and described in conjunction with figures above, it should be understood that the above-described distributed communications effects module (DCEM) and associated techniques apply also to any simulation environment, including, but not limited to, operational simulators in an operational simulation environment, virtual simulators in a virtual simulation environment, man-in-the-loop simulations, hardware-in-the-loop simulations, and any combination thereof.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments.

What is claimed is:

1. A method associated with a source federate and with a destination federate both operable in an HLA computer simulation, wherein the source federate includes an HLA run-time infrastructure interface configured to communicate with the destination federate through an HLA physical layer, and wherein the destination federate includes an HLA run-time infrastructure interface configured to communicate with the source federate through the HLA physical layer, the method comprising:

providing a first distributed communications effects module coupled between the source federate and the HLA physical layer, wherein the first distributed communications effects module comprises:

an HLA run-time infrastructure interface configured to communicate with the source federate HLA run-time infrastructure through a physical layer that does not include the HLA physical layer; and an HLA run-time infrastructure interface configured to communicate through the HLA physical layer;

receiving a simulated message from the source federate with the first distributed communications effects module;

applying simulated communications effects to the simulated message with the first distributed communications effects module; and transmitting with the first distributed communications effects module, through the HLA physical layer, the simulated message with the applied simulated communications effects to a second different distributed communications effects module coupled between the destination federate and the HLA physical layer.

2. The method of claim 1, wherein the providing the first distributed communications effects module includes:

providing a communications effects server associated with the first distributed communications effects module;

requesting virtual information associated with the simulation with the communications effects server;

receiving and storing the virtual information with the communications effects server; and generating the simulated communications effects in accordance with the virtual information.

3. The method of claim 2, wherein the virtual information includes at least one of simulated weather information or simulated cosmic information.

4. The method of claim 1, wherein the first distributed communications effects module and the second different distributed communications effects module have a same arrangement capable of generating a same plurality of simulated communications effects associated with the computer simulation, which arrangement is reconfigurable, wherein the providing the first distributed communications effects module comprises:

providing more than two communications effects protocol modules, wherein each one of the more than two communications effects protocol modules is representative of at least one of a respective communication hardware type or a respective information protocol type;

identifying at least one of a communication hardware type or an information protocol type representative of a simulated communication link associated with the simulated message;

directing the simulated message to a selected one or more of the more than two communications effects protocol modules representative of the identified at least one of the communication hardware type or the information protocol type; and applying the simulated communications effects to the simulated message with the selected one or more of the more than two communications effects protocol modules.

5. The method of claim 4, wherein the applying the simulated communications effects to the simulated message includes generating the simulated communications effects with a stochastic model configured to provide a stochastic communications simulation.

6. The method of claim 4, wherein the applying the simulated communications effects to the simulated message includes generating the simulated communications effects with a simulation of embedded software code associated with the identified communication hardware type.

7. The method of claim 4, wherein the applying the simulated communications effects to the simulated message includes generating the simulated communications effects with a communications behavior model configured to provide at least one of a simulated message completion effect or a simulated message delay effect.

8. The method of claim 4, wherein the providing the first distributed communications effects module further includes:
   providing a system interconnect (SI) module; and
   coupling, with the system interconnect module, selected ones of the more than two communications effects protocol modules together to represent the simulated communication link.

9. The method of claim 4, wherein the providing the first distributed communications effects module further includes:
   providing a communications effects server;
   requesting virtual information associated with the simulation with the communications effects server;
   receiving and storing the virtual information with the communications effects server; and
   generating the simulated communications effects in accordance with the virtual information.

10. The method of claim 9, wherein the virtual information includes at least one of simulated weather information or simulated cosmic information.

11. The method of claim 4, wherein the providing the second different distributed communications effects module comprises:
   providing another more than two communications effects protocol modules, wherein each one of the another more than two communications effects protocol modules is representative of at least one of a respective communication hardware type or a respective information protocol type;
   identifying at least one of another communication hardware type or another information protocol type representative of the simulated communication link associated with the simulated message;
   directing the simulated message having the applied simulated communications effects to a selected one or more of the another more than two communications effects protocol modules representative of the identified at least one of the another communication hardware type or the another information protocol type; and
   applying other simulated communications effects to the simulated message having the applied simulated communications effects with the selected one or more of the another more than two communications effects protocol modules.

12. A computer-readable storage medium having computer readable code thereon for providing instructions associated with a source federate and with a destination federate both operable in an HLA computer simulation, wherein the source federate includes an HLA run-time infrastructure interface configured to communicate with the destination federate through an HLA physical layer, and wherein the destination federate includes an HLA run-time infrastructure interface configured to communicate with the source federate through the HLA physical layer, the computer-readable storage medium comprising instructions for::
   providing a first distributed communications effects module coupled between the source federate and the HLA physical layer, wherein the first distributed communications effects module comprises:
      an HLA run-time infrastructure interface configured to communicate with the source federate HLA run-time infrastructure through a physical layer that does not include the HLA physical layer; and
      an HLA run-time infrastructure interface configured to communicate through the HLA physical layer;
   receiving a simulated message from the source federate with the first distributed communications effects module;
   applying simulated communications effects to the simulated message with the first distributed communications effects module; and
   transmitting the simulated message with the applied simulated communications effects through the HLA physical layer to a second different distributed communications effects module coupled between the destination federate and the HLA physical layer.

13. The computer-readable storage medium of claim 12, wherein the instructions for providing the first distributed communications effects module include instructions for:
   providing a communications effects server associated with the first distributed communications effects module;
   requesting virtual information associated with the simulation with the communications effects server;
   receiving and storing the virtual information with the communications effects server; and
   generating the simulated communications effects in accordance with the virtual information.

14. The computer-readable storage medium of claim 13, wherein the virtual information includes at least one of simulated weather information or simulated cosmic information.

15. The computer-readable storage medium of claim 12, wherein the instructions for providing the first distributed communications effects module and the instructions for providing the second different communications effects module comprise same instructions capable of generating a same plurality of simulated communications effects associated with the computer simulation, wherein couplings among the instructions are reconfigurable, wherein the instructions for providing the first distributed communications effects module comprise instructions for:
   providing more than two communications effects protocol modules, wherein each one of the more than two communications effects protocol modules is representative of at least one of a respective communication hardware type or a respective information protocol type;
   identifying at least one of a communication hardware type or an information protocol type representative of a simulated communication link associated with the simulated message;
   directing the simulated message to a selected one or more of the more than two communications effects protocol modules representative of the identified at least one of the communication hardware type or the information protocol type; and
   applying the simulated communications effects to the simulated message with the selected one or more of the more than two communications effects protocol modules.

16. The computer-readable storage medium of claim 15, wherein the instructions for applying the simulated communications effects to the simulated message include instructions for generating the simulated communications effects with a stochastic model configured to provide a stochastic communications simulation.

17. The computer-readable storage medium of claim 15, wherein the instructions for applying the simulated communications effects to the simulated message include instructions for generating the simulated communications effects with a simulation of embedded software code associated with the identified communication hardware type.

18. The computer-readable storage medium of claim 15, wherein the instructions for applying the simulated communications effects to the simulated message include instructions for generating the simulated communications effects with a communications behavior model configured to provide at least one of a simulated message completion effect or a simulated message delay effect.

19. The computer-readable storage medium of claim 15, wherein the instructions for providing the first distributed communications effects module further includes instructions for:
providing a system interconnect (SI) module; and
coupling, with the system interconnect module, selected ones of the more than two communications effects protocol modules together to represent the simulated communication link.

20. The computer-readable storage medium of claim 15 wherein the instructions for providing the first distributed communications effects module further include instructions for:
providing a communications effects server;
requesting virtual information associated with the simulation with the communications effects server;
receiving and storing the virtual information with the communications effects server; and
generating the simulated communications effects in accordance with the virtual information.

21. The computer-readable storage medium of claim 20, wherein the virtual information includes at least one of simulated weather information or simulated cosmic information.

22. The computer-readable storage medium of claim 15, wherein the instructions for providing the second distributed communications effects module comprise instructions for:
providing another more than two communications effects protocol modules associated with the second distributed communications effects module, wherein each one of the another more than two communications effects protocol modules is representative of at least one of a respective communication hardware type or a respective information protocol type;
identifying at least one of another communication hardware type or another information protocol type representative of the simulated communication link associated with the simulated message;
directing the simulated message having the applied simulated communications effects to a selected one or more of the another more than two communications effects protocol modules that are representative of the identified at least one of the another communication hardware type or the another information protocol type; and
applying other simulated communications effects to the simulated message having the applied simulated communications effects with the selected one or more of the another more than two communications effects protocol modules.

\* \* \* \* \*

UNITED STATES PATENT AND TRADEMARK OFFICE
CERTIFICATE OF CORRECTION

PATENT NO. : 7,620,537 B2
APPLICATION NO. : 11/148617
DATED : November 17, 2009
INVENTOR(S) : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 433 days.

Signed and Sealed this

Fourteenth Day of December, 2010

David J. Kappos
*Director of the United States Patent and Trademark Office*